United States Patent [19]

Ohkubo et al.

[11] Patent Number: 5,156,126
[45] Date of Patent: Oct. 20, 1992

[54] COMBUSTION CONTROL DEVICE FOR INTERNAL COMBUSTION ENGINES

[75] Inventors: Satoru Ohkubo; Shoichi Washino, both of Amagasaki; Akira Demizu, Himeji, all of Japan

[73] Assignee: Mitsubishi Denki K.K., Tokyo, Japan

[21] Appl. No.: 650,158

[22] Filed: Feb. 4, 1991

[30] Foreign Application Priority Data

Feb. 6, 1990 [JP] Japan ................................. 2-26614

[51] Int. Cl.⁵ .............................................. F02M 39/00
[52] U.S. Cl. ..................................... 123/425; 123/435; 123/357
[58] Field of Search ............... 123/425, 435, 357, 358, 123/359

[56] References Cited

U.S. PATENT DOCUMENTS

| | | | |
|---|---|---|---|
| 4,621,603 | 11/1986 | Matekunas | 123/425 |
| 4,622,939 | 11/1986 | Matekunas | 123/425 |
| 4,840,159 | 3/1989 | Matsumoto . | |
| 4,846,130 | 7/1989 | Jensen | 123/425 |
| 4,867,123 | 9/1989 | Javaherian | 123/435 |
| 4,905,648 | 3/1990 | Washino | 123/425 |
| 4,961,412 | 10/1990 | Furuyama | 123/357 |
| 4,984,546 | 1/1991 | Shimomura | 123/435 |

FOREIGN PATENT DOCUMENTS

| | | |
|---|---|---|
| 3907190 | 2/1989 | Fed. Rep. of Germany . |
| 3906674 | 6/1989 | Fed. Rep. of Germany . |
| 58-72643 | 7/1983 | Japan . |
| 63-15466 | 4/1988 | Japan . |

*Primary Examiner*—Carl S. Miller
*Attorney, Agent, or Firm*—Sughrue, Mion, Zinn, Macpeak & Seas

[57] ABSTRACT

A combustion control device for internal combustion engines, comprising cylinder pressure detecting means for detecting the combustion pressure in a cylinder, crank angle detecting means for detecting a crank angle of the engine to be controlled, cylinder pressure monitoring means for finding and monitoring the waveform of the cylinder pressure based on the cylinder pressure detected by the cylinder pressure detecting means and a crank angle signal outputted from the crank angle detecting means, calculating means for calculating thermal efficiency based on the found waveform, and combustion control means for controlling the amount of fuel supply to the engine, ignition timing and the amount of exhaust gas recirculation, depending on the results of the calculation by the calculating means.

6 Claims, 4 Drawing Sheets

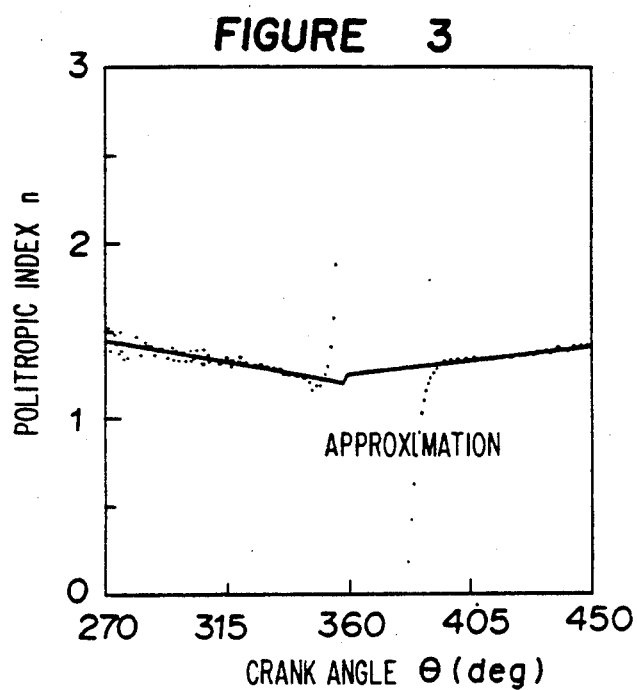
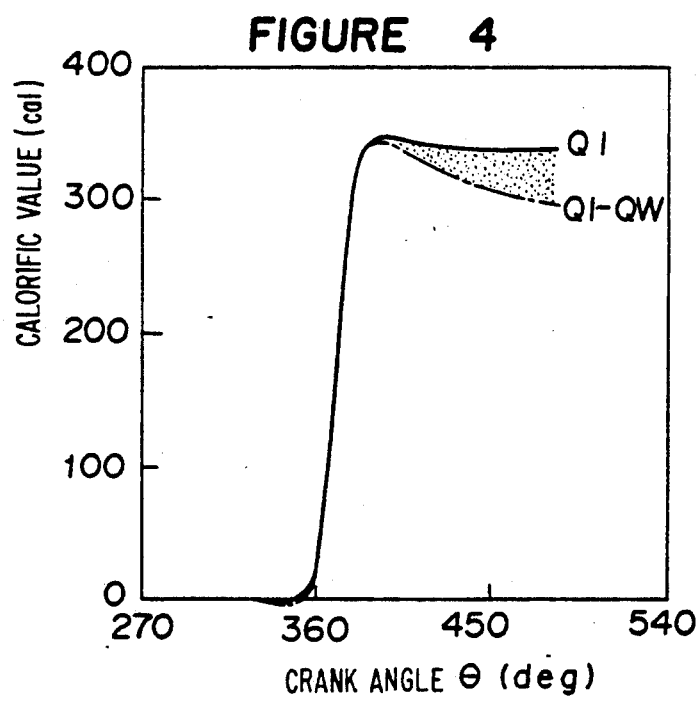

COMBUSTION CONTROL DEVICE FOR INTERNAL COMBUSTION ENGINES

BACKGROUND OF THE INVENTION

1. Field of the Invention

The present invention relates to a combustion control device for internal combustion engines, which detects the pressure in a cylinder of an automobile internal combustion engine or the like, and calculates thermal efficiency based on the detected cylinder pressure to control the combustion in the engine.

2. Discussion of Background

There has been known such a combustion control device as disclosed in e.g. Japanese Unexamined Patent Publication No. 72643/1983. The conventional combustion control device uses a cylinder pressure sensor to detect the pressure in a cylinder of the engine to be controlled. The device finds the crank angle at which the detected pressure reaches the maximum value. The device compares the crank angle at that time with the values in a predetermined range to judge whether the engine is being driven at the maximum output or not. Depending on the results of the judgment, the device can suitably adjust the amount of fuel supply (air fuel ratio), ignition timing and the amount of exhaust gas recirculation (EGR) to control the engine at the maximum efficiency and under stable combustion, and also to prevent knocking from occurring.

The conventional internal engine combustion control judges the combustion state by comparing the crank angle having the maximum cylinder pressure with the values in the predetermined range. Change with time of the engine causes the waveform of the cylinder pressure to change, which creates a problem in that the combustion control based on the single factor, i.e. the maximum cylinder pressure, can not always drive the internal engine at the maximum efficiency and under stable combustion.

SUMMARY OF THE INVENTION

It is an object of the present invention to eliminate the disadvantage of the conventional combustion control device and to provide a new and improved combustion control device for internal combustion engines capable of keeping the expected performance by making suitable correction to the change in the combustion state (thermal efficiency) due to change with time of the engine, thereby driving the engine at the optimum thermal efficiency at all times.

The foregoing and other objects of the present invention have been attained by providing a combustion control device for internal combustion engines, comprising cylinder pressure detecting means for detecting the combustion pressure in a cylinder, crank angle detecting means for detecting the crank angle of the engine to be controlled, cylinder pressure monitoring means for finding and monitoring the waveform of the cylinder pressure based on the cylinder pressure detected by the cylinder pressure detecting means and a crank angle signal outputted from the crank angle detecting means, calculating means for calculating thermal efficiency based on the found waveform, and fuel control means for controlling the amount of fuel supply to the engine, ignition timing and the amount of exhaust gas recirculation, depending on the results of the calculation by the calculating means.

The cylinder pressure detecting means can use a cylinder pressure sensor to detect the combustion pressure. The crank angle detecting means can use a crank angle sensor to detect the crank angle of the engine.

The cylinder pressure monitoring means has the cylinder pressure P and the crank angle signal $\theta$ inputted to find the waveform of the cylinder pressure. The calculating means calculates thermal efficiency based on the found waveform. The calculated thermal efficiency is inputted into a corresponding region in an $N$-$T_p$ map showing the relationship between engine speeds N and basic injection pulse widths $T_p$, depending on the operating conditions of the engine at that time. Then the average value in the predetermined cycles is found in each region.

In each region, the average value is compared to the thermal efficiency reference value preset in the map. Depending on the results of the comparison, the combustion control means can advance or retard the ignition timing, cut the exhaust gas recirculation, or increase or decrease the amount of fuel supply, thereby obtaining a good combustion state.

In accordance with the present invention, when the thermal efficiency $\eta_A$ found from the cylinder pressure Waveform has become smaller than the reference value due to change with time of the engine, the EGR, the ignition timing or the amount of fuel supply can be controlled to improve the combustion state, thereby allowing the engine to be driven in an effective and stable manner at all times.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a characteristic diagram showing politropic index; and

FIG. 4 is a characteristic diagram showing the relationship between calorific value and the amount of heat loss.

DESCRIPTION OF THE PREFERRED EMBODIMENTS

Figure 1:
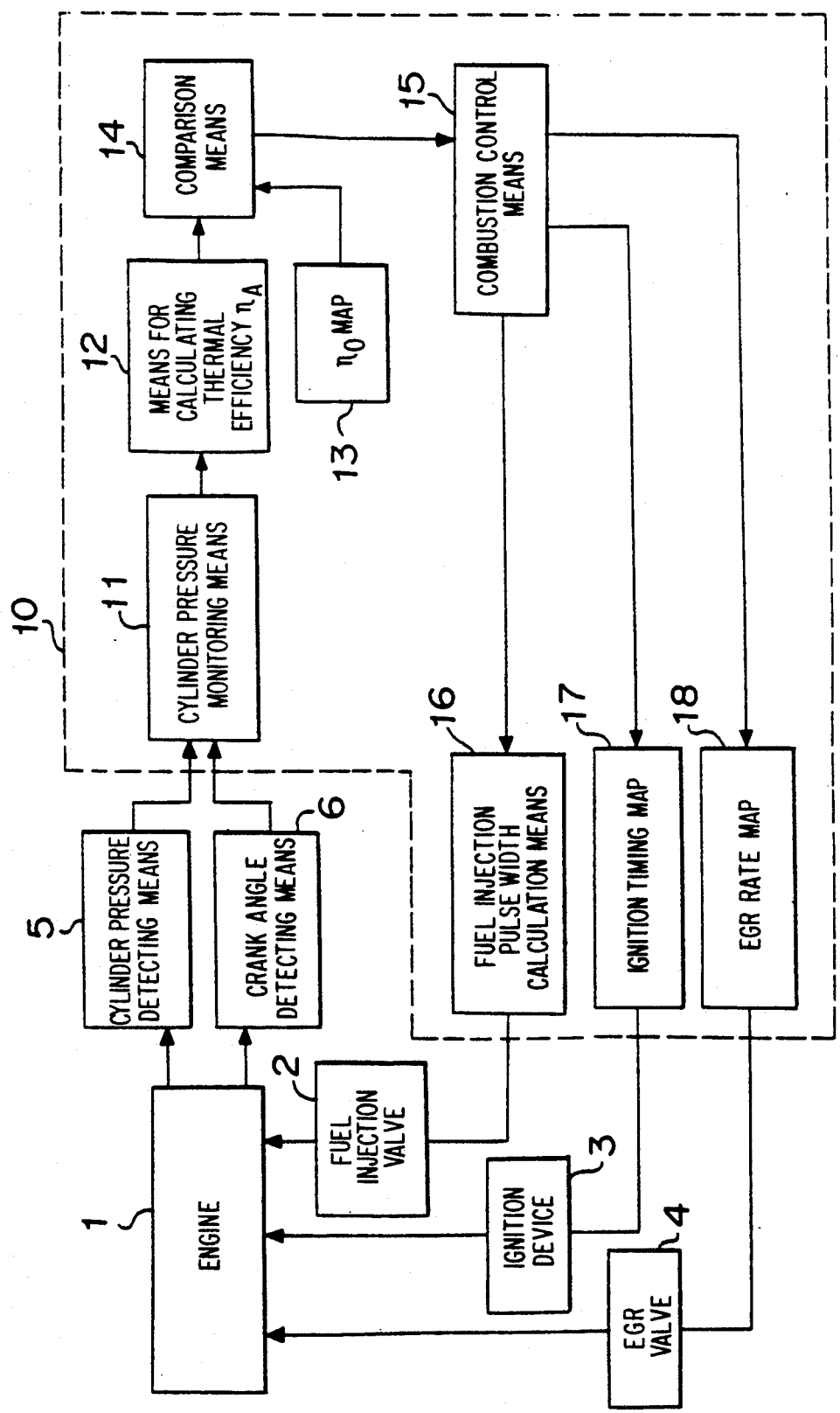
FIG. 1 is a block diagram showing an embodiment of the combustion control device according to the present invention.

The present invention will be described in detail with reference to an embodiment illustrated in the accompanying drawings. Referring now to FIG. 1, there is shown a block diagram showing the structure of the embodiment.

In FIG. 1, reference numeral 1 designates the engine to be controlled. Reference numeral 2 designates a fuel injection valve which is operated with a injection pulse width which is obtained by correcting a basic fuel injection pulse width $T_p$ depending on the operating conditions of the engine, and which supplies the engine with fuel in the amount corresponding to the corrected injection pulse width.

An ignition device 3 receives an ignition command to provide ignition energy for an ignition plug of the engine through a distributor and the like.

An exhaust gas recirculation control valve (hereinbelow, referred to as the EGR valve) 4 can decrease the maximum combustion temperature under the action of EGR (exhaust gas recirculation) to restrain the occurrence of $N_{ox}$.

Cylinder pressure detecting means 5 uses a pressure sensor which is mounted, e.g. to face the combustion chamber of the engine 1, uses a charge amplifier to amplify a signal detected by the pressure sensor, thereby obtaining a waveform indicating of the cylinder pressure.

Crank angle detecting means 6 uses a crank angle sensor which is mounted to a crank shaft, and detects a crank angle signal with the sensor. Output signals from the cylinder pressure detecting means 5 and the crank angle detecting means 6 are inputted into a control unit 10 which is constituted by a microcomputer and other elements.

The control unit 10 includes cylinder pressure monitoring means 11, means 12 for calculating thermal efficiency $\eta_A$, an $\eta_O$ map 13, comparison means 14, a combustion control means 15, fuel injection pulse width calculating means 16, an ignition timing map 17 and an EGR rate map 18. Such constituent elements of the control unit 10 will be explained.

The cylinder pressure P detected by the cylinder pressure detecting means 5, and the crank angle $\theta$ detected by the crank angle detecting means 6 can be inputted into the cylinder pressure monitoring means 11 in the control unit 10 to find the cylinder pressure waveform (P-$\theta$ diagram) for each one cycle.

The output signal from the cylinder pressure monitoring means 11 is inputted to the thermal efficiency calculating means 12 which is one of the features of the present invention.

In the thermal efficiency calculating means 12, the thermal efficiency $\eta_A$ is found according to the calculation which will be explained below. The found thermal efficiency is inputted into a corresponding region in the N-$T_p$ map which has been prepared in the form of RAM or the like which show the relationship between the engine speeds N and the basic injection pulse widths $T_p$. The inputted thermal efficiency is subjected to an averaging process in each region.

The map 13 which shows a reference value $\eta_O$ for thermal efficiency prestores thermal efficiency reference value in each region in the N-$T_p$ map.

The comparison means 14 compares the reference value $\eta_O$ with the thermal efficiency $\eta_A$ calculated by the thermal efficiency calculating means 12. The output from the comparison means 14 is inputted into the combustion control means.

Based on the comparison results by the comparison means 14, the combustion control means 15 can carry out such control that it cuts the EGR controlled by the EGR rate map 18, stepwisely changes the ignition timing in the regions in the ignition timing map 17, or stepwisely changes, by a predetermined rate, the amount of fuel injection which is commanded to the air fuel injection pulse width calculating means 16.

If the combustion state can not fall in the reference ranges under such control, the combustion state is decided to be out of control, and an alarm in the control unit 10, which is not shown, is activated to give an alarm signal to the driver.

The fuel injection pulse width calculating means 16 finds the basic injection pulse width $T_p$ based on intake air amount $G_a$ and the engine speed N, calculates required fuel injection amount by adding various corrections to the found basic injection pulse width, and increase or decrease the amount of fuel supply based on a signal from the combustion control means 15.

The intake air amount $G_a$ can be found by the cylinder pressure monitoring means 11. The intake air amount $G_a$ can be found by using the fact that the intake air amount $G_a$ has a relationship to the difference $\Delta P$ between the cylinder pressure which is at a predetermined crank angle after the intake valve has closed, and the cylinder pressure which is at a predetermined crank angle before ignition.

The ignition timing map 17 has the optimum ignition timing set in each region of the N-$T_p$ map. The ignition timing map 17 can stepwisely advance the spark timing by $\alpha$ angle or stepwisely retard the spark timing by $\beta$ angle based on a control signal from the combustion control means 15.

The EGR rate map 18 has the optimum EGR rate set in each region of the N-$T_p$ map. The EGR rate map 18 can carry out the EGR cut or the EGR return in accordance with a command from the combustion control means 15.

Now, the calculation which is made in the thermal efficiency calculating means 12 will be explained in detail. Thermal efficiency $\eta$ is related to supplied calorific value Q1 and heat loss value QW, and is generally defined as shown in the following equation (1):

$$\eta = \frac{Q1 - QW}{Q1} = 1 - \frac{QW}{Q1} \quad (1)$$

The calorific value Q1 and the heat loss value QW at each crank angle can be calculated using the following equations (2) and (3) and the following equations (4) and (5):

$$Q1 = \int \frac{dQ1}{d\theta} d\theta \quad (2)$$

where $$\frac{dQ1}{d\theta}$$

is expressed as follows:

$$\frac{dQ1}{d\theta} = \frac{A}{K(T) - 1} [V \frac{dP}{d\theta} + \left\{ K(T) + \frac{\beta(\theta)}{CV(T)} \cdot \left(1 - \frac{TW}{T(\theta)}\right) \frac{V(\theta)}{V(\theta)} \right\} P \frac{dV}{d\theta} \quad (3)$$

$$QW = \int \frac{dQW}{d\theta} d\theta \quad (4)$$

wherein $$\frac{dQW}{d\theta}$$

is expressed as follows:

$$\frac{dQW}{d\theta} = \left( \frac{1}{N \cdot 360 \cdot 60} \right) h(\theta) \cdot f(\theta) \cdot (T(\theta) - TW) \quad (5)$$

The meanings of the references which are used in the equations (1) to (5) are described in the following Table 1:

Table 1

A: heat equivalent of work (Kcal/kgm)
P: pressure in cylinder (kg/cm$^2$)
CV: specific heat at constant volume (Kcal/kg° C.)
Pb: pressure in intake pipe (KPa)
f: heat-transmission area (m$^2$)
Q1: calorific value by combustion (cal)
Ga: intake air amount (kg)
QW: heat loss value (cal)
h: heat transmission rate (Kcal/m$^2$h° C.)
R: gas constant
K: specific heat ratio
T: gas temperature (° K.)
N: engine speed (rpm)
TW: cylinder wall temperature (° K.)
n: politropic index
V: cylinder volume (m$^3$)
$\theta$: crank angle (deg)
$\beta(\theta)$ in the equation (3) can be found using the following equation (6):

$$\beta(\theta) = \frac{\{n(\theta) - K(T)\} \cdot C_V(T)}{\left(1 - \frac{TW}{T(\theta)}\right) \cdot \frac{V(\theta)}{V(\theta)}} \quad (6)$$

In the equation (6), $\beta(\theta)$ indicates politropic index. As shown in FIG. 3, the politropic index which is obtained between the closing of the intake valve and just prior to ignition spark is used before top dead center to carry out approximate process according to the least-squares method.

After top dead center, the politropic index which is obtained between completion of the combustion and the opening of the exhaust valve is used to carry out approximate process according to the least-squares method.

The cylinder wall temperature TW in the equation (3) is assumed to be e.g. 150° C., and the gas temperature $T(\theta)$ in the equation (3) is found using the following equation (7):

$$T(\theta) = \frac{G_a \cdot R}{P(\theta) \cdot V(\theta)} \quad (7)$$

wherein the Specific heat at constant value $C_v$ and the specific heat ratio K can be considered as a function of temperature.

As explained, the cylinder pressure of the engine can be measured to easily calculate thermal efficiency. FIG. 4 is graph which shows the relationship between the calorific value Q1 and the heat loss value QW. In FIG. 4, the calorific value Q1 which corresponds to crank angles is indicated by a solid line, and Q1-QW is indicated in a dotted line.

Figure 2A:
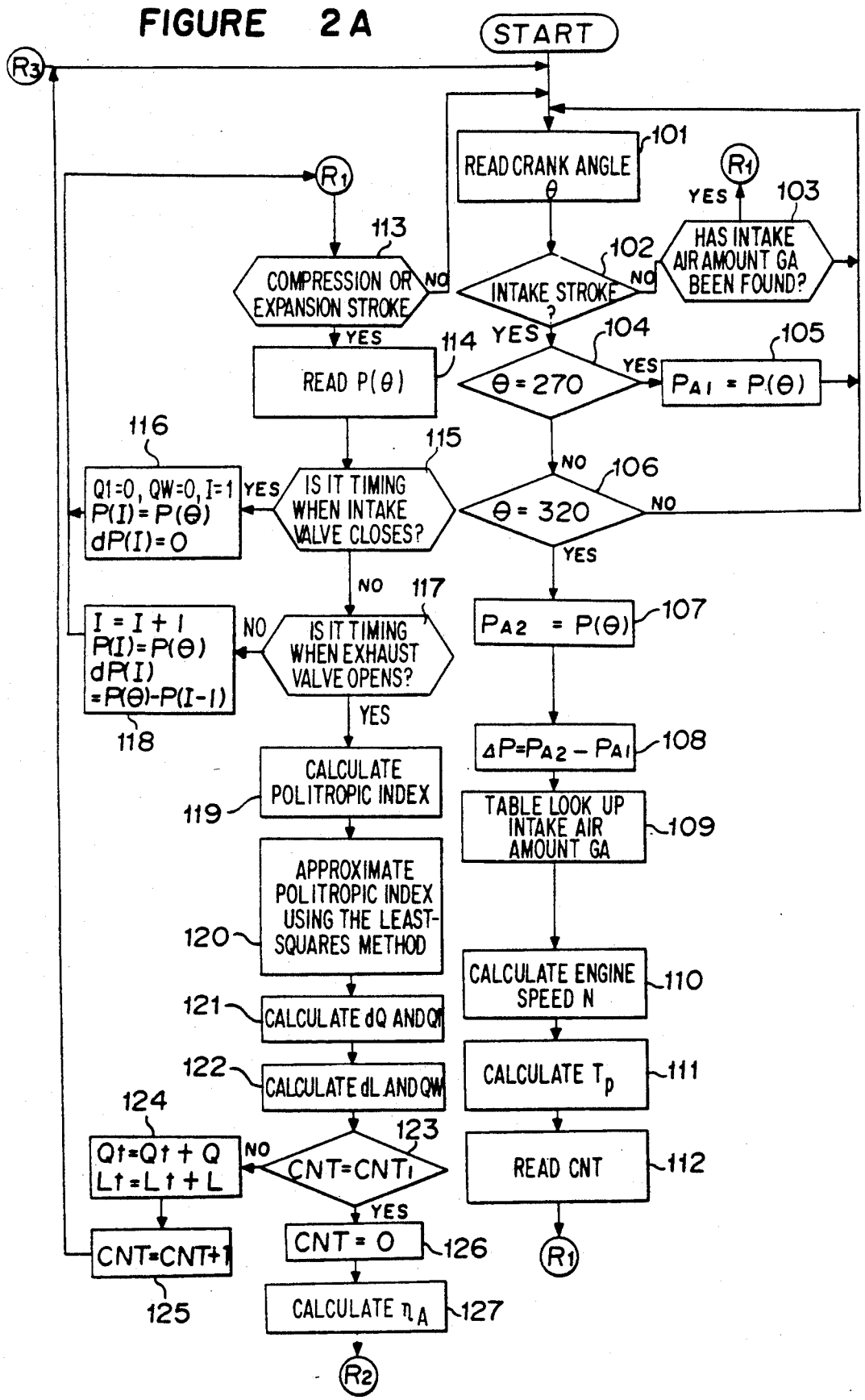
FIGS. 2A and 2B are flowcharts showing the operations of the embodiment.

Next, the operation of the combustion control device according to the present invention will be explained in reference to the flowcharts of FIGS. 2A and 2B. First, the intake air amount is calculated from the cylinder pressure in the compression stroke. In FIG. 2A, at Step 101, the crank angle $\theta$ is read by the crank angle detecting means 6, using the top dead center in the intake stroke as reference. At Step 102, it is judged whether the engine is in the intake stroke or not.

When the engine is not in the intake stroke at Step 102, i.e. NO, the program proceeds to a discrimination operation step at Step 103, where it is judged whether the intake air amount $G_a$ has been calculated or not by judging whether a counter is 0 or not.

If the engine is in the intake stroke at Step 102, the program proceeds from the YES side of the Step 102 to the discrimination operation step at Step 104 where it is judged whether it is now a first timing to detect the cylinder pressure or not.

The Step 104 can define that the condition of YES is e.g. $\theta = 270°$. At Step 105, the cylinder pressure $P(\theta)$ is read by the cylinder pressure detecting means 5, and the read value is stored as PA1. After that, the program returns to the Step 101, and reading the crank angle $\theta$ will be continued.

If the equation $\theta = 270°$ is satisfied at the Step 104 (NO), the program proceeds to Step 106 where it is judged whether it is a second timing to detect the cylinder pressure or not. If NO, the program returns to the Step 101.

The Step 106 can decide as YES to proceed to Step 107 when e.g. the equation $\theta = 320°$ is satisfied. At the Step 107, the cylinder pressure $P(\theta)$ is read by the cylinder pressure detecting means 5, the detected cylinder pressure is stored as PA2, and the program proceeds to Step 108.

At the Step 108, the difference between PA2 found by the Step 107 and PA1 found by the Step 105 is calculated by the cylinder pressure monitoring means 11, and the calculated value is stored as a difference pressure $\Delta P$. Then the program proceeds to Step 109.

The cylinder pressure monitoring means 11 uses the difference pressure $\Delta P$ found by the Step 108 to carry out table-look-up of the intake air amount $G_a$.

Next, in order to see a working point of engine, the crank angle detecting means 6 finds the engine speed N at the next Step 110. The engine speed N can be found by measuring the number of pulses of the position signal (1° signal) from the crank angle sensor during a predetermining period.

At the next Step 111, the cylinder pressure monitoring means 11 finds the basic injection pulse width $T_p$ based on the intake air amount $G_a$ found in the Step 109 and the engine speed N found in the Step 110.

At the next Step 112, the number in the counter which is stored in the respective regions of the N-$T_p$ map is read.

Next, at Step 113, it is judged whether the engine is under the compression or expansion strokes or not. If the engine is not in the compression or expansion strokes (NO), the program returns to the Step 101.

By the way, if it is judged as YES at the Step 103, the program also proceeds to the Step 113 where it is judged whether the engine is under the compression or expansion strokes or not.

If it is judged as YES at the Step 113, the cylinder pressure $P(\theta)$ is read by the cylinder pressure monitoring means 11 at the next Step 114, and the program proceeds to Step 115.

At the Step 115, it is judged whether or not the crank angle $\theta$ indicates the timing when the intake valve closes. If the result of the judgment leads to YES, the program proceeds to Step 116 where the value indicative of the calorific value Q1 and that indicative of the heat source value QW are initialized. In addition, the operation I=1 is made, and the cylinder pressure $P(\theta)$ is stored as P(I). A variable dP(I) in the cylinder pressure is set to zero. If it is judged as NO at the Step 115, the program proceeds to Step 117 where it is judged whether or not the crank angle $\theta$ indicates the timing when the exhaust valve opens. If it is judged as NO at the Step 117, the program proceeds to Step 118 where the operation $I = I + 1$ is made, and the cylinder pressure $P(\theta)$ is stored in $P(I)$. The variable $dP(I)$ in the cylinder pressure is stored after having made the operation $dP(I) = P(I) - P(I-1)$.

If it is judged as YES at the Step 117, the program proceeds to Step 119. At that time, the cylinder pressure P and the variable dP in the cylinder pressure which are obtained just after the intake valve has closed and just before the exhaust valve opens have been already found. The thermal efficiency calculating means 12 calculates politropic index $n(\theta)$, using the following equation (8), and the program proceeds to Step 120:

$$n(\theta) = -\frac{\frac{dP}{d\theta}/P(\theta)}{\frac{dV}{d\theta}/V(\theta)} \qquad (8)$$

At the Step 120, the politropic index $n(\theta)$ found in the Step 119 is used, and the approximate process according to the least-squares method is carried out with reference to the compression stroke and the expansion stroke, both strokes having $\theta = 360°$ as a boundary. The approximated range in the compression stroke is after the intake valve has closed and just before the ignition spark is made. The approximated range in the expansion stroke is from e.g. top dead center 50° after completion of the combustion and just before the exhaust valve opens.

The politropic index in the combustion stroke is calculated for each crank angle, using the approximate expression as stated earlier. At the next Step 121, a calorification rate is calculated using the equation (3), and the calorification rate is integrated to find the calorific value.

At the next Step 122, the heat loss rate is calculated using the equation (5), and the heat loss rate is integrated to find the heat loss value.

The program proceeds to Step 123 where it is judged whether the number in the counter CNT has reached a predetermined value $CNT_i$ or not. The predetermined value $CNT_i$ indicates the average time of finding the thermal efficiency, and it is set in every region of the $N$-$T_p$ map.

If it is judged as being NO at the Step 123, the program proceeds to Step 124 where prearrangement for the approximate operation is made. At the next Step 125, 1 is added to the counter, and then the program returns to the Step 101.

If it is judged as being YES at the Step 123, the value of the counter CNT is set to zero at the next Step 126, and the program proceeds to Step 127 where the thermal efficiency $\eta A$ is calculated.

Figure 2B:
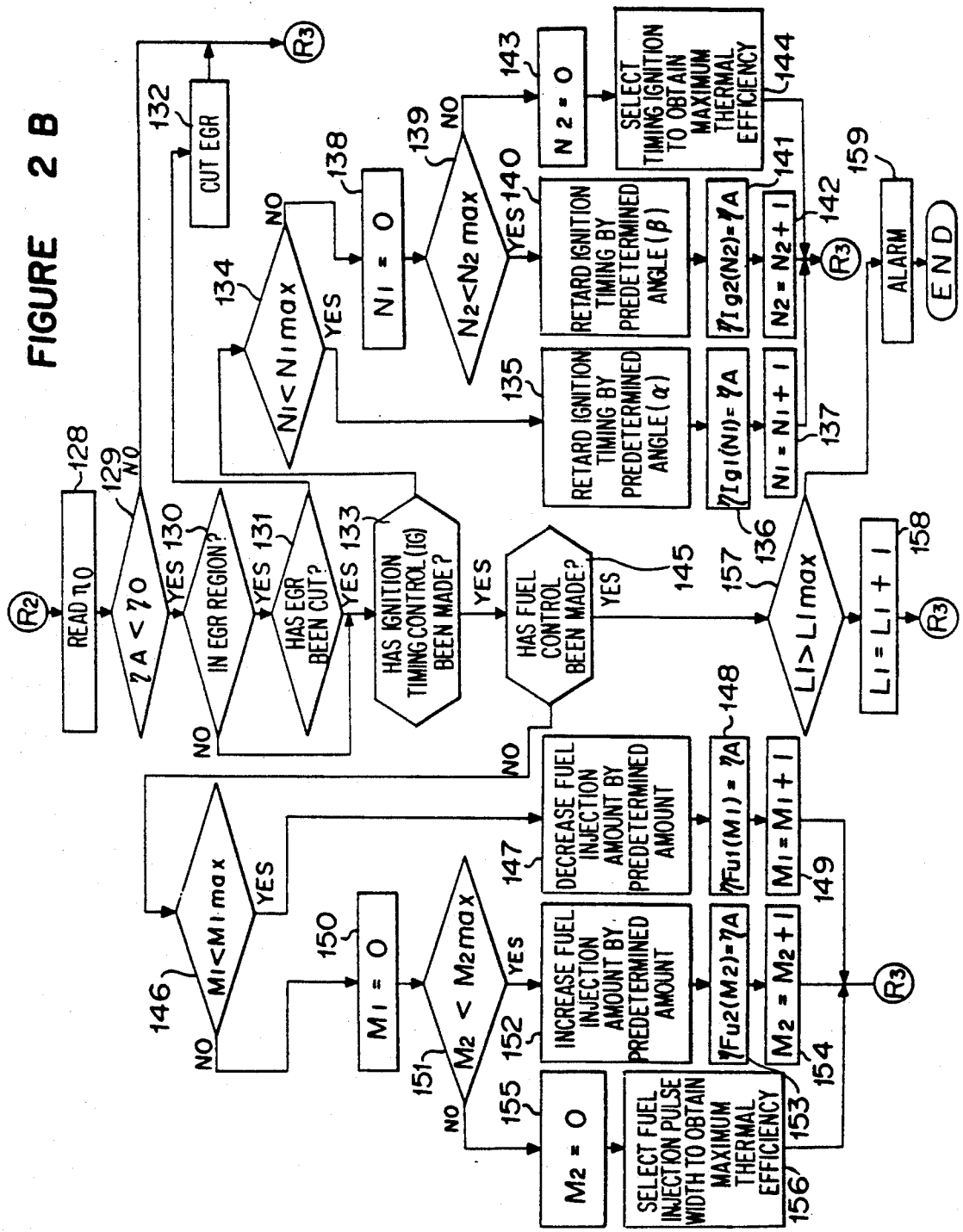

Next, the program proceeds to Step 128 which is shown in the flowchart of FIG. 2B. The basic value $\eta_O$ for the thermal efficiency which is set in every region of the $N$-$T_p$ map is read, and then the program proceeds to Step 129.

At the Step 129, the thermal efficiency $\eta_A$ is compared to the basic value $\eta_O$ by the comparison means 14.

If $\eta_A < \eta_O$ is satisfied as the result of the comparison, the combustion control means 15 judges at Step 130 whether the region in question is an EGR region or not.

If NO, the program jumps to Step 133. If the region in question is the EGR region at the Step 130, it is judged whether the EGR cut has been made at the Step 131 or not. If NO, the EGR cut is made at Step 132.

If the EGR cut is not enough to improve the thermal efficiency, or if the region in question is not the EGR region, ignition timing control will be made.

If the judgment of Step 133 indicates that the ignition timing control has not been made, the program proceeds to Step 134 where it is judged whether the counter N1 for the ignition timing control has exceeded a preset value $N1_{max}$ or not.

The counter N1 is to count the time of the angle retard control. If $N1 < N1_{max}$ is satisfied, the program proceeds to Step 135 where a control signal which indicates that the ignition timing is retarded by $\alpha°$ in only the region in question is given to the ignition device 3 through the ignition timing map 17.

At the next Step 136, the thermal efficiency $\eta_A$ and the ignition timing are memorized in $\eta_{Ig1}$ (N1). At the next Step 137, 1 is added to the counter N1. Such operations are repeated for every certain time until $\eta_A \geq \eta_O$ is satisfied.

If such repeated operations can not give a good control state, and if the count number N1 has reached the preset value $N1_{max}$, it is judged as being NO at the Step 134, and the program proceeds to Step 138 where the counter N1 is reset to zero. Then the program proceeds to Step 139.

At the Step 139, it is judged whether a counter N2 for the ignition timing control has exceeded a preset value $N2_{max}$ or not. The counter N2 is to count the time of the angle advance control.

If $N2 < N2_{max}$ is satisfied at the Step 139, the program proceeds to Step 140 where a control signal which indicates that the ignition timing is retarded by $\beta°$ in only the region in question is given to the ignition device 3 through the ignition timing map 17. Then the program proceeds to Step 141.

At the Step 141, the thermal efficiency $\eta_A$ and the ignition timing are memorized in $\eta_{Ig2}$ (N2). At the next Step 142, 1 is added to the counter N2. Such operations are repeated for every certain time until $\eta_A \geq \eta_O$ is satisfied.

If such repeated operations can not an effective control state, and if the count number N2 has reached the preset value $N2_{max}$, it is judged as being NO at the Step 139, and the program proceeds to Step 143 where the counter N2 is reset to zero. After that, the program proceeds to Step 144.

At the Step 144, the ignition timing when the thermal efficiency reaches maximum among $\eta_{Ig1}$ and $\eta_{Ig2}$ is selected and is commanded to the ignition device 3 through the ignition timing map 17. Fuel control follows.

At the Step 133, if it is judged as being carrying out the ignition timing control, the program proceeds to the discrimination operation at Step 145.

If the discrimination by the Step 145 determines that the fuel control has not been made yet, the program proceeds to Step 146 where it is judged whether a counter M1 for the fuel control has exceeded a preset value $M1_{max}$ or not.

The counter M1 is to count the time of fuel supply decreasing controls. If $M1 < M1_{max}$ is satisfied, the program proceeds to Step 147 where a signal which indicates that the fuel injection amount is decreased by a predetermined amount only in the region in question is given to the fuel injection valve 2 by the fuel injection pulse width calculating means 16. After that, the program proceeds to Step 148.

At the Step 148, the thermal efficiency $\eta_A$ and the fuel injection pulse width are memorized in $\eta_{Ful}(M1)$, and 1 is added to the counter M2 at the next Step 149. Such operations are repeated for every certain time until $\eta_A \geqq \eta_O$ is obtained.

If Such repeated operations can not a good control state, and if the count number M1 has reached a preset value M1$_{max}$, it is judged as being NO at the Step 146, and the program proceeds to Step 150 where the counter M1 is reset to zero. Then, the program proceeds to Step 151.

At the step 151, it is judged whether the counter M2 for the fuel control has exceeded a preset value M2$_{max}$ or not. The counter M2 is to count the time of fuel supply increasing controls.

If the result of the discrimination operation at the Step 151 indicates that M2<M2$_{max}$ is satisfied, the program proceeds to Step 152 where a signal which indicates that the fuel injection amount is increased by a predetermined amount only in the region in question is given to the fuel injection valve 2. Then the program proceeds to Step 153.

At the Step 153, the thermal efficiency $\eta_A$ and the fuel injection pulse width are memorized in $\eta_{Fu2}(M2)$, and 1 is added the counter M2 at the next Step 154. Such operations are repeated for every certain time until $\eta_A \geqq \eta_O$ is satisfied.

If such repeated operations can not give a good control state, and if the count number M2 has reached the preset value M2$_{max}$, it is judged as being NO at the Step 151, and the program proceeds to Step 155 where the counter M2 is reset to zero. Then the program proceeds to Step 156.

At the Step 156, the fuel injection pulse width that the thermal efficiency reaches maximum among $\eta_{Ful}$ and $\eta_{Fu2}$ ia selected and ia given to the fuel injection valve 2.

In order to repeat such operations at a predetermined time, it is judged at Step 157 whether the predetermined time has been reached or not. At Step 158, 1 is added to a counter L1. If the counter L1 has reached L1$_{max}$, it is judged as being out of control, and the alarm (not shown) is activated by the fuel control means 15 at Step 159 to give an alarm to the driver.

As explained, in the embodiment, even if the thermal efficiency $\eta_A$ has become smaller than the reference value due to change with time of the engine, the EGR, the ignition timing or the fuel injection amount can be controlled to improve the combustion state, allowing the combustion to be carried out at all times like the initial setting.

Although the explanation of the embodiment has been made for the single cylinder, the present invention is applicable to multicylinder internal combustion engines.

The intake air amount $G_a$ can be detected by using an intake air amount sensor. In addition, the combustion control device according to the present invention can be combined with a device which can detect the presence and the absence of knocking based on the cylinder pressure waveform to carry out a suitable engine control.

Obviously, numerous modifications and variations of the present invention are possible in light of the above teachings. It is therefore to be understood that within the scope of the appended claims, the invention may be practiced otherwise than as specifically described herein.

What is claimed is:

1. A combustion control device adapted for use with an internal combustion engine having at least one cylinder, comprising:

cylinder pressure detecting means for detecting the combustion pressure in said at least one cylinder;

cylinder angle detecting means for detecting a crank angle of the engine to be controlled;

cylinder pressure monitoring means for determining and monitoring the waveform of the cylinder pressure based on the cylinder pressure detected by the cylinder pressure detecting means and a crank angle signal outputted from the crank angle detecting means;

calculating means for calculating thermal efficiency based on the waveform determined by said cylinder pressure monitoring means; and combustion control means for controlling the amount of fuel supplied to the engine, ignition timing and the amount of exhaust gas recirculation, based on the thermal efficiency calculated by the calculating means and a comparison of a value of the calculated thermal efficiency with a predetermined value based on engine speed and a fuel injection pulse width.

2. A combustion control device according to claim 1, wherein the cylinder pressure monitoring means finds the waveform for each one cycle.

3. A combustion control device according to claim 1, wherein said combustion control means includes an N-T$_p$ map, and wherein the thermal efficiency calculated by the calculating means is inputted into a corresponding region in said N-T$_p$ map displaying the relationship between the engine speeds N and basic injection pulse widths T$_p$.

4. A combustion control device according to claim 3, wherein the thermal efficiency inputted into the N-T$_p$ map is averaged in predetermined cycles for each region.

5. A combustion control device according to claim 3, further comprising a thermal efficiency reference value map, which has thermal efficiency reference values prestored in corresponding regions of the N-T$_p$ map.

6. A combustion control device according to claim 5, further comprising comparison means which compares the thermal efficiency averaged by the calculating means with the reference values of the thermal efficiency reference value map, and the output from which is inputted into the combustion control means.

* * * * *